United States Patent
Benthien et al.

(10) Patent No.: US 12,371,164 B2
(45) Date of Patent: Jul. 29, 2025

(54) INSTALLATION SYSTEM AND METHOD FOR INSTALLING A SELF-SUPPORTING TRUSS STRUCTURE

(71) Applicant: Airbus Operations GmbH, Hamburg (DE)

(72) Inventors: Hermann Benthien, Hamburg (DE); Andreas Poppe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 10 days.

(21) Appl. No.: 18/501,274

(22) Filed: Nov. 3, 2023

(65) Prior Publication Data
US 2024/0174364 A1    May 30, 2024

(30) Foreign Application Priority Data
Nov. 30, 2022   (EP) ..................................... 22210627

(51) Int. Cl.
*B64D 11/00*    (2006.01)

(52) U.S. Cl.
CPC .................................. *B64D 11/003* (2013.01)

(58) Field of Classification Search
CPC .......... B64D 11/003; B64D 11/00; B64F 5/10
See application file for complete search history.

(56) References Cited

U.S. PATENT DOCUMENTS

| 1,380,856 A | * | 6/1921 | Wallerstein | A47F 7/26 312/133 |
| 2,081,529 A | * | 5/1937 | Canney | B64D 11/00 244/118.6 |
| 2,092,655 A | * | 9/1937 | Page, Jr. | B64D 11/00 244/118.6 |

(Continued)

FOREIGN PATENT DOCUMENTS

| DE | 102017131130 A1 | 6/2019 |
| DE | 102019134746 A1 | 6/2021 |
| DE | 102021102576 A1 | 8/2022 |

OTHER PUBLICATIONS

European Search Report for corresponding European Patent Application No. 22210627.0 dated May 16, 2023; priority document.

*Primary Examiner* — Medhat Badawi
(74) *Attorney, Agent, or Firm* — Greer, Burns & Crain, Ltd.

(57) ABSTRACT

A system for installing a self-supporting truss structure having interconnected truss elements on an aircraft fuselage. The truss structure has radially outer closed truss nodes and radially inner releasable connecting nodes. The installation system has a carrying device, movable on a fuselage floor and with an upper receptacle, a stand for temporarily holding truss elements in predetermined relative positions, and a movement device, on the upper receptacle, and holding the stand in a settable position relative to the support surface. The stand is further away from the support in installation positions than in a transport position. The installation system (Continued)

is configured, with the stand in the transport position, to move the carrying device into a predetermined internal fuselage position and to lock it there, to move the stand into a suitable installation position via the movement device, and to lock the at least one lockable connecting node via a drive.

14 Claims, 5 Drawing Sheets

(56) References Cited

U.S. PATENT DOCUMENTS

| | | | | |
|---|---|---|---|---|
| 2,494,985 | A * | 1/1950 | Campbell | B64C 27/51 416/106 |
| 3,377,044 | A * | 4/1968 | Jackson | B60P 7/0846 188/371 |
| 3,525,490 | A * | 8/1970 | Duncan | A47B 96/20 244/122 R |
| 3,721,484 | A * | 3/1973 | Macioge | A47F 3/005 312/247 |
| 3,784,989 | A * | 1/1974 | LeGrand | B61D 31/00 244/118.6 |
| 3,938,627 | A * | 2/1976 | Nagazumi | B60R 22/28 280/805 |
| 3,968,863 | A * | 7/1976 | Reilly | F16F 7/123 188/372 |
| 3,994,451 | A * | 11/1976 | Cole | B64C 3/48 244/214 |
| 4,178,032 | A * | 12/1979 | Hone | A61G 3/0825 5/9.1 |
| 4,621,780 | A * | 11/1986 | Doyhamboure | B64C 1/22 105/396 |
| 4,648,570 | A * | 3/1987 | Abdelmaseh | B64C 1/22 267/141.1 |
| 4,799,631 | A * | 1/1989 | Humphries | B64C 1/066 244/119 |
| 5,024,398 | A * | 6/1991 | Riedinger | B64D 11/0605 244/118.5 |
| 5,083,727 | A * | 1/1992 | Pompei | B64D 11/04 244/118.6 |
| 5,108,048 | A * | 4/1992 | Chang | B64D 11/003 244/118.1 |
| 5,115,999 | A * | 5/1992 | Buchsel | B64D 11/00 244/119 |
| 5,201,481 | A * | 4/1993 | Hararat-Tehrani | B64C 1/10 410/121 |
| 5,207,045 | A * | 5/1993 | Bodnar | E04C 3/09 52/635 |
| 5,217,184 | A * | 6/1993 | Hararat-Tehrani | B64D 9/00 410/121 |
| 5,395,074 | A * | 3/1995 | Hart | B64D 11/003 244/119 |
| 5,513,908 | A * | 5/1996 | Williams | A47B 77/02 211/90.03 |
| 5,549,258 | A * | 8/1996 | Hart | B64D 11/003 312/246 |
| 5,716,027 | A * | 2/1998 | Hart | B64D 11/003 244/118.1 |
| 5,784,836 | A * | 7/1998 | Ehrick | B64D 11/00 52/79.8 |
| 5,785,303 | A * | 7/1998 | Kutschi | A47C 23/02 267/86 |
| 5,839,694 | A * | 11/1998 | Bargull | B64D 11/003 312/247 |
| 5,842,668 | A * | 12/1998 | Spencer | B64D 11/003 312/246 |
| 5,855,291 | A * | 1/1999 | Ingle | B60R 7/02 220/666 |
| 5,938,149 | A * | 8/1999 | Terwesten | B64D 11/003 248/505 |
| 5,984,254 | A * | 11/1999 | Baloche | B60N 2/073 296/65.14 |
| 6,007,024 | A * | 12/1999 | Stephan | B64D 11/003 248/503 |
| 6,062,509 | A * | 5/2000 | Burrows | B64D 11/003 244/118.5 |
| 6,173,550 | B1 * | 1/2001 | Tingley | D04H 3/02 52/841 |
| 6,237,872 | B1 * | 5/2001 | Bar-Levav | B64D 11/0601 105/340 |
| 6,464,169 | B1 * | 10/2002 | Johnson | B64D 11/0007 244/118.6 |
| 6,536,710 | B1 * | 3/2003 | Bobzien | B64D 11/003 244/119 |
| 6,616,098 | B2 * | 9/2003 | Mills | B64D 11/00 244/129.6 |
| 6,622,965 | B1 * | 9/2003 | Sergiy | B64D 11/003 244/118.1 |
| 6,848,654 | B1 * | 2/2005 | Mills | B64D 11/00 244/118.6 |
| 6,874,731 | B1 * | 4/2005 | Brauer | B64D 11/003 312/246 |
| 6,883,753 | B1 * | 4/2005 | Scown | B64C 1/06 244/118.1 |
| 6,886,779 | B2 * | 5/2005 | Bansemir | F16F 7/12 244/54 |
| 7,234,666 | B2 * | 6/2007 | Novak | B64D 11/003 244/118.5 |
| 7,481,397 | B2 * | 1/2009 | Steinbeck | B64D 11/003 312/319.1 |
| 7,762,496 | B2 * | 7/2010 | Seiersen | B64D 11/00 244/118.6 |
| 7,918,418 | B2 * | 4/2011 | Stephan | B64D 11/003 244/118.1 |
| 7,987,596 | B2 * | 8/2011 | Ritts | B64D 11/02 29/434 |
| 8,074,928 | B2 * | 12/2011 | Haack | B64D 11/0696 244/119 |
| 8,104,841 | B2 * | 1/2012 | Malapati | B60R 22/18 297/468 |
| 8,226,033 | B2 * | 7/2012 | Koefinger | B64D 11/003 312/247 |
| 8,256,712 | B2 * | 9/2012 | Sorensen | B64D 11/06 114/189 |
| 8,317,132 | B2 * | 11/2012 | Pein | B64D 11/003 403/322.3 |
| 8,474,758 | B2 * | 7/2013 | Koefinger | B64C 1/068 244/119 |
| 8,528,859 | B2 * | 9/2013 | Gross | B64D 11/003 312/246 |
| 8,991,757 | B2 * | 3/2015 | Grosse-Plankermann | B64C 1/066 244/119 |
| 9,056,685 | B2 * | 6/2015 | Umlauft | B64F 5/10 |
| 9,090,357 | B2 * | 7/2015 | Oberoi | B64F 5/50 |
| 9,308,995 | B2 * | 4/2016 | Spellman | B64D 11/00 |
| 9,511,863 | B2 * | 12/2016 | Schneider | A47B 46/00 |
| 9,644,765 | B2 * | 5/2017 | Breuer | F16L 3/26 |
| 9,758,233 | B2 * | 9/2017 | King | B64D 11/003 |
| 9,878,791 | B2 * | 1/2018 | Kammerer | B64D 11/003 |
| 10,046,843 | B2 * | 8/2018 | Doran | B64D 11/003 |
| 10,053,204 | B2 * | 8/2018 | King | B64D 11/00 |
| 10,364,032 | B2 * | 7/2019 | Kammerer | B64D 11/003 |
| 10,457,375 | B2 * | 10/2019 | Roth | B64C 1/061 |
| 10,604,048 | B2 * | 3/2020 | Vela | B60N 2/231 |
| 10,773,782 | B2 * | 9/2020 | Metten | B64F 5/00 |
| 11,136,124 | B2 * | 10/2021 | Benthien | F16B 33/00 |
| 11,465,747 | B2 * | 10/2022 | Cassou | B64F 5/10 |
| 11,628,954 | B2 * | 4/2023 | Papendick | B64F 5/10 244/119 |
| 11,767,117 | B2 * | 9/2023 | Morishima | B64D 11/0605 244/118.5 |
| 12,024,291 | B2 * | 7/2024 | Hegenbart | B64C 1/066 |
| 2002/0150747 | A1 * | 10/2002 | Wellman | B29C 70/86 428/297.4 |
| 2003/0111310 | A1 * | 6/2003 | Renton | F16F 7/128 188/374 |

(56) References Cited

U.S. PATENT DOCUMENTS

| | | | |
|---|---|---|---|
| 2004/0016847 A1* | 1/2004 | Ritts | B64D 11/003 244/118.5 |
| 2005/0040287 A1* | 2/2005 | Stephan | B64D 11/003 244/118.5 |
| 2005/0184194 A1* | 8/2005 | Schaefer | B66F 7/00 244/118.1 |
| 2006/0049310 A1* | 3/2006 | Park | B64D 11/00 244/118.5 |
| 2006/0086886 A1* | 4/2006 | Humfeldt | B64C 1/066 248/636 |
| 2006/0101631 A1* | 5/2006 | Zeigler | E04B 1/3441 29/897.31 |
| 2007/0241231 A1* | 10/2007 | Meyer-Rusitschka | B64D 11/0604 244/118.5 |
| 2008/0283662 A1* | 11/2008 | Park | B64C 1/068 244/118.5 |
| 2009/0218777 A1* | 9/2009 | Wood | B64C 1/06 280/93.51 |
| 2009/0230244 A1* | 9/2009 | Kofinger | B64D 11/003 29/428 |
| 2009/0250554 A1* | 10/2009 | Graeber | B64C 1/066 244/119 |
| 2010/0133381 A1* | 6/2010 | Klaukien | B64C 1/064 244/119 |
| 2010/0243805 A1* | 9/2010 | Gross | B64C 1/064 244/119 |
| 2011/0024565 A1* | 2/2011 | Koefinger | B64C 1/068 244/131 |
| 2011/0133027 A1* | 6/2011 | Graeber | B64C 1/066 244/131 |
| 2012/0131779 A1* | 5/2012 | Umlauft | B62B 3/10 29/281.5 |
| 2012/0145828 A1* | 6/2012 | Grosse-Plankermann | B64F 5/10 29/700 |
| 2012/0228431 A1* | 9/2012 | Umlauft | B64D 11/003 264/249 |
| 2015/0035424 A1* | 2/2015 | Rittner | B64D 11/003 312/327 |
| 2016/0122019 A1* | 5/2016 | Jobst | A61G 3/00 244/118.5 |
| 2016/0304183 A1* | 10/2016 | Ahlen | F16M 13/022 |
| 2017/0050677 A1* | 2/2017 | Czinger | B62D 29/048 |
| 2017/0057613 A1* | 3/2017 | King | B64D 11/00 |
| 2018/0009520 A1* | 1/2018 | Metten | B64C 1/06 |
| 2018/0258673 A1* | 9/2018 | Schoerkhuber | B64D 11/003 |
| 2019/0092473 A1* | 3/2019 | Benthien | B60R 5/003 |
| 2019/0092478 A1* | 3/2019 | Gilbert | B64C 1/0696 |
| 2019/0193871 A1* | 6/2019 | Benthien | B64D 11/003 |
| 2020/0324918 A1* | 10/2020 | Hegenbart | F16B 45/026 |
| 2023/0057345 A1* | 2/2023 | Hegenbart | B64C 1/066 |
| 2024/0174364 A1* | 5/2024 | Benthien | B64F 5/10 |

* cited by examiner

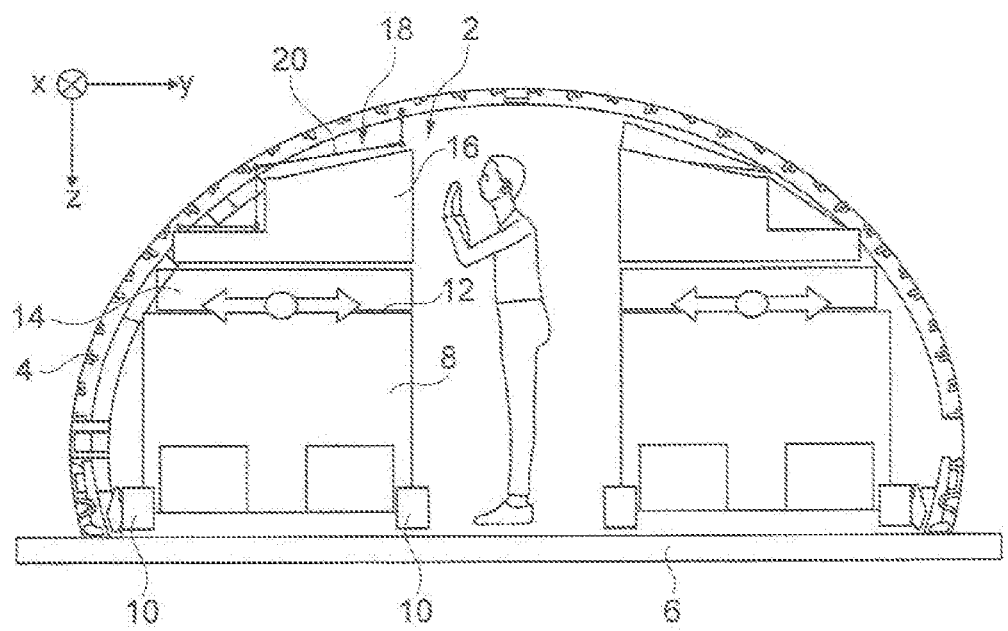
Fig. 1
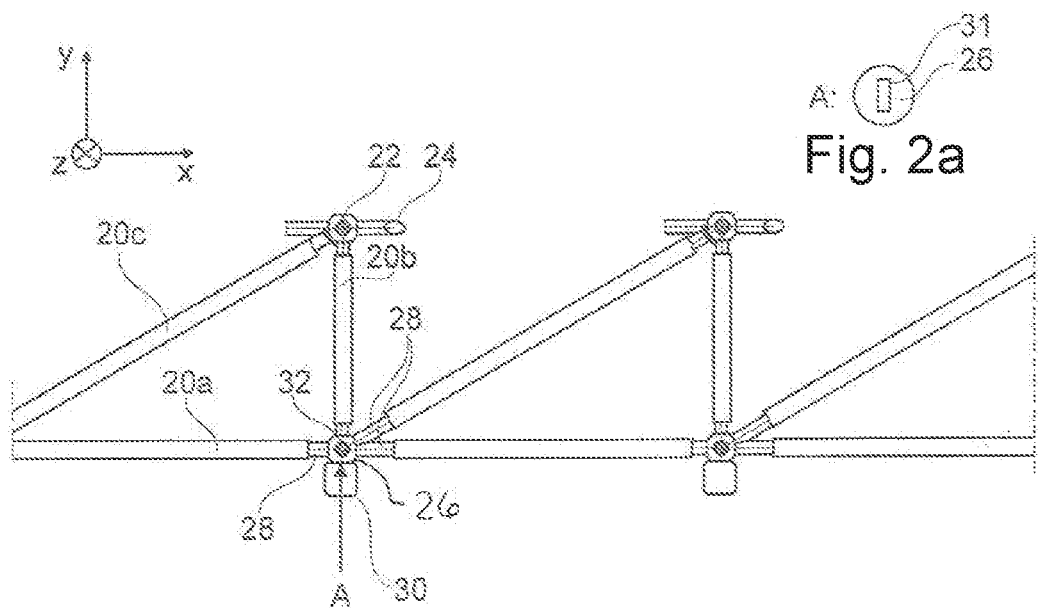
Fig. 2a
Fig. 2

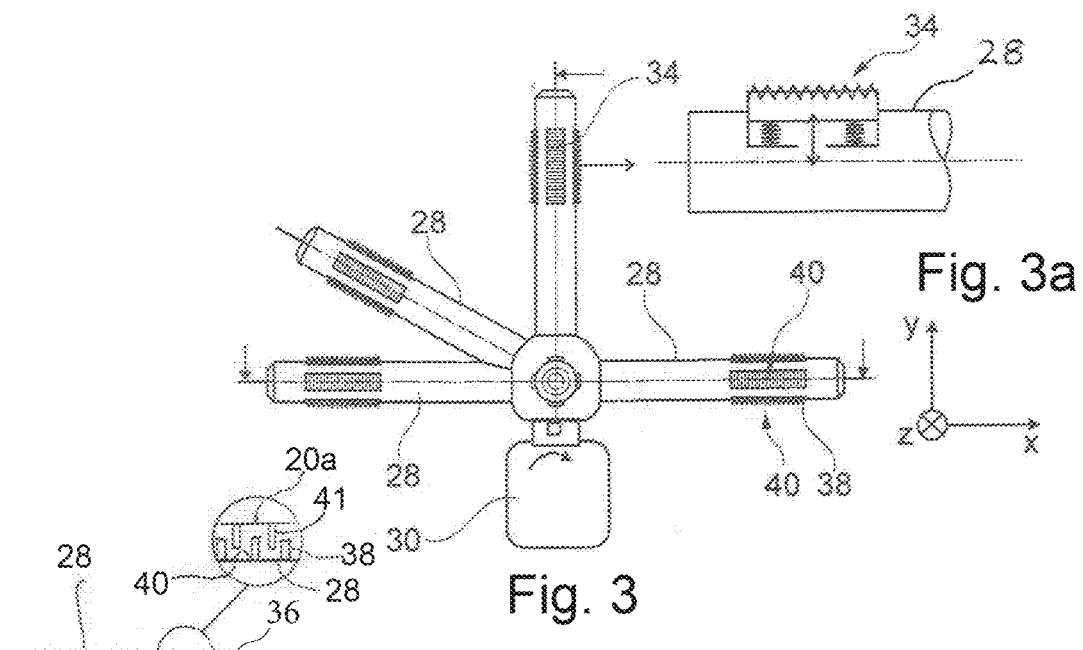
Fig. 3a
Fig. 3
Fig. 3b
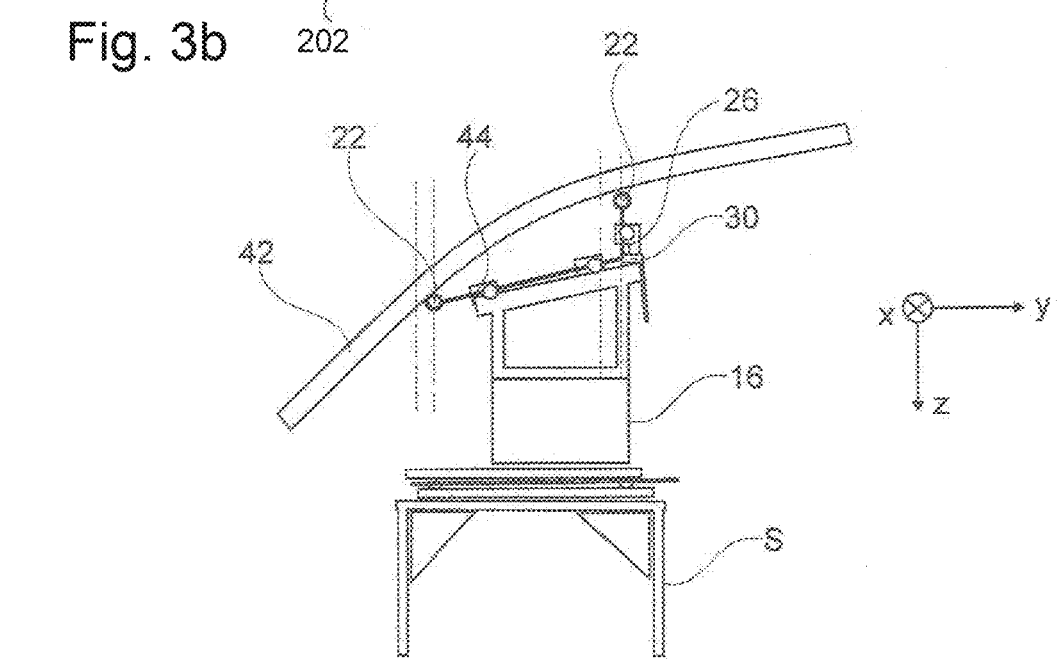
Fig. 4a

INSTALLATION SYSTEM AND METHOD FOR INSTALLING A SELF-SUPPORTING TRUSS STRUCTURE

CROSS-REFERENCES TO RELATED APPLICATIONS

This application claims the benefit of the European patent application No. 22210627.0 filed on Nov. 30, 2022, the entire disclosures of which are incorporated herein by way of reference.

FIELD OF THE INVENTION

The invention relates to an installation system and a method for installing a self-supporting truss structure in a fuselage of an aircraft, and to an aircraft having a self-supporting truss structure installed therein.

BACKGROUND OF THE INVENTION

To secure equipment items in a fuselage of an aircraft, a large number of holders matched individually to the equipment items to be received are often arranged on an inner side. Moreover, the prior art includes truss-type systems in which triangular structures are formed for the attachment of PSU units and overhead stowage compartments. In the case of aircraft and, in particular, of larger commercial aircraft with fuselage lengths of well over 10 meters, certain manufacturing tolerances must always be expected, and these must be taken into account and, where necessary, compensated for in the arrangement of holders and in the design of truss-type structures, ensuring that the equipment items arranged thereon comply with a clearly specified geometry in the fuselage. Consequently, installing equipment items requires checking and, where necessary, adjustment of their alignment.

DE 10 2017 131 130 A1 discloses a fastening system for fastening components on a fuselage structure in an interior of an aircraft.

SUMMARY OF THE INVENTION

It is an object of the invention to propose an installation system or a method for installing a truss structure in a fuselage of an aircraft in which installation can be carried out in a manner which is as simple as possible, with as little as possible manual effort and, at the same time, simple compensation of tolerances.

The proposal is for an installation system for installing a self-supporting truss structure having a plurality of interconnected truss elements on a fuselage structure of an aircraft, wherein the truss structure has radially outer closed truss nodes and radially inner releasable connecting nodes, the installation system having a mobile carrying device, which can be moved on a floor of the fuselage and has an upper receptacle, a stand for temporarily holding the truss elements in predetermined positions relative to one another, and a movement device, which is arranged on the upper receptacle and holds the stand in a position that can be set relative to the upper receptacle, wherein the movement device is designed to hold the stand in a transport position and in any desired installation position, wherein the stand is further away from the upper receptacle in the installation positions than in the transport position, wherein the installation system is designed, when the stand is in the transport position, to move the mobile carrying device on the floor into a predetermined position within the fuselage and to lock it there, to move the stand into a suitable installation position by means of the movement device, and to lock the at least one lockable connecting node by means of a drive arranged on the stand.

The installation system should be understood to mean a system for installing a plurality of truss elements in a fuselage structure. In this context, the fuselage structure could comprise fuselage frames and/or other components which are designed to impart the required shape and strength to the fuselage. The system comprises technical aids for moving, holding and installing the truss elements. However, the installation system can also comprise the truss elements and all the equipment arranged thereon that is necessary for the permanent installation of the truss elements. The installation system is suitable for the formation of a self-supporting truss structure in the fuselage. According to the invention, this is significantly simplified in comparison with known installation systems and methods by the equipment explained further below.

The self-supporting truss structure is formed by the truss elements, which extend in various spatial directions and, at the same time, form nodal points at which they are connected to one another. In the installed state, the truss structure is arranged on the fuselage, in particular on fuselage frames, and forms a three-dimensional fixed construct for the attachment of equipment and furnishment items.

A closed truss node should be understood to mean that in this node the truss elements involved are constantly connected to one another. Consequently, it is impossible to release or open the closed node, or at least not without destruction.

A releasable connecting node in the sense according to the invention should be understood to mean a device which can be connected to a plurality of truss elements that come together in a node. By way of example, the releasable connecting node can be connected to three, four or more truss elements that form an intersection in the node connector. The connecting node is designed to establish or release a connection to the relevant truss elements. As is explained in somewhat greater detail below, the truss structure can be secured in fuselage receptacles or the like, resulting in the spatial positions of individual truss elements of the truss structure depending on toleranced fuselage dimensions. The orientations thereof relative to one another, which are expressed by angles between individual truss elements, are predetermined to ensure the structural configuration. The releasable connecting node is preferably designed to compensate for tolerance-related dimensional deviations by locking the truss elements in their orientations.

A truss element could be a truss rod or some other element forming the truss. A truss rod could preferably be a rod-shaped element which can absorb tension and compression forces. A truss rod is preferably hollow. It can consist of a metallic material, e.g., a suitable aluminum alloy. Fiber-reinforced plastics are conceivable as an alternative. As alternatives, it would also be possible to use plate-type truss elements or a combination of truss rods and plate-type truss elements or other elements. It is conceivable, for example, to construct a truss in such a way that a PSU unit or the like forms part of the truss.

The floor of the fuselage should preferably be understood to mean the floor of the cabin which is formed in the fuselage. The mobile carrying device can preferably be moved in an axial direction on the floor in the fuselage to move it into a predetermined position there. The carrying device could be moved actively by an integrated drive or by being pulled or pushed on the floor. Locking of the carrying device could comprise locking wheels, positive connection to a rail, or other measures. The carrying device could also be embodied as a plurality of carrying devices, in particular a series of carrying devices which are coupled to one another. The mutually coupled carrying devices can be moved into the fuselage along a common movement path in order to fill a certain part of the axial length of the fuselage there and to install a truss structure there. It is furthermore conceivable to provide two such arrangements of carrying devices, which are moved into the fuselage simultaneously on the floor in order to install a truss structure on each of two sides of the cabin simultaneously.

The stand for temporarily holding the truss structure is matched to the shape and orientations of the truss elements. The preassembled truss structure can preferably be laid, placed or inserted on the stand from above in order to enable the stand to hold the truss structure in a desired spatial orientation and to be moved by the movement device.

The movement device enables the stand to be held in a transport position and in any desired installation position. The transport position can be understood as a compacted state of the arrangement comprising the carrying device, the movement device and the stand. The preassembled truss structure can therefore be preassembled outside the fuselage and placed on the stand in order then to be moved into the fuselage. At the position intended for installation, the movement device can then, in particular, raise the stand and move it radially outward toward the fuselage.

The movement device furthermore has a drive, which can be connected or coupled using a corresponding means on the connecting node in order to lock the node selectively. As explained further below, the truss structure and receptacles on the fuselage structure could be matched to one another in such a way that the movement device enables the truss structure to be latched into receptacles on the fuselage structure at the outside of the cabin, in order then to lock the connecting node using the drive, wherein the truss elements then have a locked position determined by tolerance-related dimensional deviations.

Overall, the installation system according to the invention results in particularly simple and to a large extent fully automatable installation of a truss structure in a fuselage, while, at the same time, tolerance-related dimensioned deviations can be compensated for.

In one advantageous embodiment, the connecting node has a plurality of node elements, which are arranged at an angle to one another and can each be connected positively to a truss element. Each node element can be connected to one end of a truss element. If the truss elements are hollow, one of the node elements could be inserted into each truss element for example in order to be connected positively there to the truss element. A connecting node could, for example, receive two truss elements extending in the axial direction, a radially extending truss element, a vertically extending truss element, and at least one diagonally extending truss element. The resulting node elements are arranged at corresponding angles to one another and thus define the alignment of the truss elements.

In one advantageous embodiment, the connecting node is rigid. Consequently, the angles of the individual node elements are invariable and thus ensure a desired alignment of the truss elements connected thereto. Unwanted skewing of truss elements extending in the axial direction, radial direction and vertical direction can thereby be avoided.

In one advantageous embodiment, the connecting node has first positive engagement means for each relevant truss element, which are designed to be complementary to second positive engagement means on the truss elements, wherein the first positive engagement means can be brought by means of an actuating element provided in the connecting node into a locking position, in which they engage in the second positive engagement means, and into an insertion position, in which they can be moved relative to the second positive engagement means. The first positive engagement means could, for example, comprise first toothing, and the second positive engagement means could comprise toothing corresponding thereto. By virtue of this configuration, the truss elements are axially movable in the insertion position, and it is always possible for them to be connected to one another in their tolerance-related individual adopted position by the engagement of the positive engagement means. The actuating element could, for example, serve to move the first positive engagement means on the node connector and thus allow selective engagement in the second positive engagement means.

In one advantageous embodiment, in the insertion position, the first positive engagement means can be moved relative to the second positive engagement means, and, in the locking position, can be locked in the respective position. For example, the first positive engagement means of the respective node element of the connecting node could be movable in the radial direction. For this purpose, it would be possible to provide a plurality of first positive engagement means which are distributed over a periphery of the node element and can be moved radially outward or inward on the node element by the actuating element. Second positive engagement means could be arranged radially on the inside in the cavity of the truss element, into which the node element can be inserted. Inserting the node element into the truss element and subsequently moving the actuating element enables the first positive engagement means to engage in the second positive engagement means, resulting in locking of the relevant truss element on the connecting node.

In one advantageous embodiment, the actuating element can be connected to the drive. On an outer side, the connecting node could comprise an engagement element that can be connected mechanically to the drive. It may be expedient to configure the engagement element in such a way that it is clearly apparent visually whether the actuating element is in the locking position or in the insertion position. For this purpose, the engagement element could be of elongate design or have an elongate marking and be movable only by a limited angle of, for example, 90° or less. In the locking position, the engagement element could, for example, be aligned parallel to a longitudinal axis of the fuselage, and could be aligned vertically or obliquely thereto in an insertion position. It is advantageous to arrange the engagement element on a side of the truss structure which faces away from a fuselage wall in order to ensure good accessibility.

In one advantageous embodiment, the installation system furthermore has a plurality of latching receptacles, which can be secured in the fuselage structure and are designed to receive latching elements of radially outer nodes of the truss structure and to latch therewith by means of mechanical pressure directed from the relevant node to the respective receptacle. In particular, the latching receptacles could be arranged in fuselage frames. The latching receptacles could be designed to guide a latching element aligned only roughly relative to the respective latching receptacle into a latching opening of the relevant latching receptacles, with the result that the relevant truss element or relevant node moves into a toleranced receiving position of the latching receptacles.

The carrying device and/or the movement device could be designed to exert the required mechanical pressure on the preassembled truss structure to carry out the latching in the relevant latching opening. The stand should therefore be capable of holding the preassembled truss structure in a sufficiently firm manner to enable the force to be transmitted to the truss structure.

In one advantageous embodiment, the stand has a plurality of upwardly open receptacles, into or onto which the truss elements can be brought. The receptacles are preferably designed to correspond to lower truss elements of the preassembled truss structure. These can receive truss elements aligned in a longitudinally axial and radial manner and, for this purpose, can be designed as slots or grooves, for example. It is also conceivable to use a multiplicity of upwardly open, e.g., U-shaped, holders, into which the preassembled truss structure can be inserted.

In one advantageous embodiment, a subset of the open receptacles is aligned radially, wherein the radially aligned receptacles are resiliently mounted in the axial direction. The radially aligned receptacles can exert a force on radially aligned truss elements, thus enabling radially outer ends of these truss elements, on which a latching element can be arranged, to be pressed into corresponding receptacles. The resilient mounting does not result in any distortion of the radial truss elements since different end positions of the radial truss elements as a result of tolerances can be compensated for by springs subject to different levels of compression.

In one advantageous embodiment, the installation system furthermore has at least one transport retainer for holding the truss structure in the open receptacles. The transport retainer can be a band, a touch and close strip, an adhesive tape, a clip, or some other means that acts by positive engagement, nonpositive engagement or material bonding in order to fix the preassembled truss structure on the stand. In this context, the fixing must not be particularly firm so as to enable the movement device and/or the carrying device to release the stand from the fuselage structure as they move out of the fuselage.

The invention furthermore relates to an aircraft, having a fuselage and a self-supporting truss structure arranged therein, which is implemented by means of an installation system in accordance with the above description.

In one advantageous embodiment, the truss structure is arranged on radially outer regions of a passenger cabin in order to hold overhead stowage compartments.

The invention furthermore relates to a method for installing a self-supporting truss structure having a plurality of interconnected truss elements on a fuselage structure of an aircraft, wherein the truss structure has radially outer closed truss nodes and radially inner releasable connecting nodes, the method having the steps of providing a preassembled truss structure in the fuselage on a stand which is held by a carrying device in such a way that it can be moved by means of a movement device, moving the carrying device to a predetermined position within the fuselage, locking the carrying device, raising the stand and moving it in a radial direction to align it on a fuselage structure, latching the outer truss nodes to corresponding latching receptacles on the fuselage structure by urging the truss structure in an axial direction into the latching receptacles, wherein a predetermined alignment of the truss elements relative to one another is maintained, locking the radially inner connecting nodes, and removing the stand.

In one advantageous embodiment, the removal of the stand comprises lowering the stand, moving the stand in a direction away from the fuselage structure, and moving it out of the fuselage.

BRIEF DESCRIPTION OF THE DRAWINGS

Exemplary embodiments are explained in greater detail below with reference to the attached drawings. The illustrations are schematic and not to scale. Identical reference signs refer to identical or similar elements. More specifically:

FIG. 1 shows a schematic illustration of a fuselage with an installation system arranged therein.

FIG. 2 shows a schematic plan view of a truss structure.

FIG. 2a shows the interior of a connecting node as indicated by A in FIG. 2.

FIG. 3 shows a schematic side view of a connecting node.

FIG. 3a shows a schematic side sectional view of the first positive engagement element of FIG. 3.

FIG. 3b shows a schematic side sectional view of a modified first positive engagement element, and a second positive engagement element of FIG. 3.

FIG. 4a shows a schematic view of part of the installation system on a fuselage frame.

DETAILED DESCRIPTION OF THE PREFERRED EMBODIMENTS

Figures 4B, 4C, 4D:
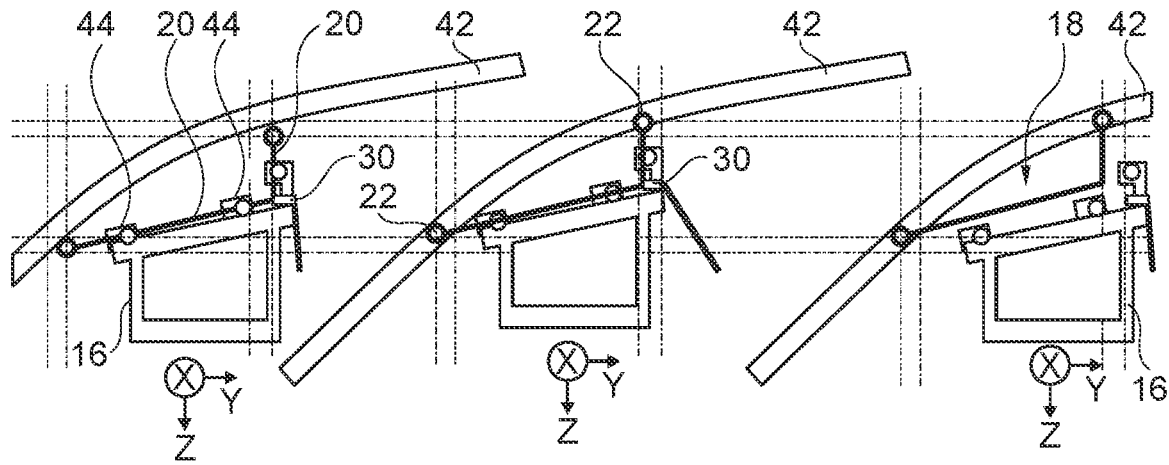
FIGS. 4b-4d show schematic views of the stand during the installation of the truss.

FIG. 1 shows an installation system 2 in a fuselage 4 of an aircraft. Here, a floor 6 is shown, on which a mobile carrying device 8 is arranged and can be moved on the floor 6. For this purpose, the carrying device 8 has a plurality of wheels 10, which stand on the floor 6 and allow wheel-guided movement on the floor 6.

The carrying device 8 is designed to be moved, in particular along a longitudinal axis of the fuselage 4. The carrying device 8 has an upper receptacle 12, on which a movement device 14 is arranged. This is designed to move a stand 16 in three spatial directions, i.e., in the longitudinal direction of the fuselage 4, in the radial direction and in the vertical direction. Located on the stand 16 is a preassembled truss structure 18, which comprises a plurality of truss elements 20. The movement device 14 is provided for the purpose of placing the stand 16 and thus the preassembled truss structure 18 on the fuselage 4 in such a way that it is or can be permanently secured there. Overhead stowage compartments, PSU units or other items can be secured thereon.

FIG. 2 shows a plan view of the truss structure 18. Axial truss elements 20a, radial truss elements 20b and diagonal truss elements 20c are shown here. Arranged radially on the outside, i.e., oriented toward the fuselage structure 4, are outer nodes 22, which are each equipped with a latching element 24, which are aligned axially and can be latched in in an axial direction. The latching element 24 is provided to be latched into corresponding receptacles (not shown here) on fuselage frames by mechanical pressure in an axial direction.

Radially on the inside, i.e., facing away from the fuselage structure 4, node connectors 26 are provided, each of which has a plurality of node elements 28 arranged at an angle to one another, which can be connected to truss elements 20. The truss elements 20 can each be moved along their longitudinal axis on the node element 28. A drive 30 belonging to the system 2 can be coupled via an engagement element 31 to an actuating element 32 in the interior of the connecting node 26 and can connect the node elements 28 positively to the truss elements 20 or release them therefrom.

When the latching elements 24 are latched in corresponding receptacles on fuselage frames, the stand 16 is capable of aligning, in particular, the radial truss elements 20b and the axial truss elements 20a in a desired manner and then connecting the connecting node 26 to the truss elements 20 by means of the drive 30.

FIG. 3 shows the connecting node 26 in a plan view. First positive engagement means 34, which are in the form of toothed elements that can be moved in a radial direction on the node elements 28, can be seen here and in detail in FIG. 3a. The actuating element 32 is preferably capable of moving the first positive engagement means 34 radially outward when necessary.

By way of example, and as shown in greater detail in FIG. 3b, a modified first positive engagement means 36 is additionally arranged on one of the node elements 28, which first positive engagement means comprises a plurality of radial projections 38 and wide grooves 40 located therebetween instead of toothing. Corresponding, second positive engagement means 41 can move slightly through the grooves 40 in an axial direction, given sufficient axial force. It is conceivable to use such first positive engagement means 36 on only a small number of node connectors 26, for example on every fourth, fifth or sixth connecting node 26, in order to allow movement of truss elements 20a in the longitudinal direction along the longitudinal axis when required, in order to prevent distortion of the truss structure 18 in the event of thermal expansion or contraction.

FIG. 4a shows the carrying device 8, on which the stand 16 is present in a transport position. The preassembled truss structure 18 is consequently located vertically and radially at a sufficient distance from a fuselage frame 42 and can consequently be moved along the longitudinal axis in the fuselage 4. FIG. 4b shows this direction of movement, which extends into the plane of the drawing. To carry the truss structure 18, the stand 16 has receptacles 44, which are open at the top and into which the formatted truss structure 18 is inserted.

In FIG. 4c, the stand 16 is moved upward and radially outward toward the fuselage frame 42, with the result that outer nodes 22 of the truss structure 18 are guided directly to the fuselage frame 42. After latching in, as shown in FIG. 6b, the truss structure 18 is secured on the fuselage frame 42 and remains there. The drive 30 can then lock the connecting nodes 26 of the truss structure 18. The stand 16 is then moved vertically toward the floor 6 and radially inward to release it from the truss structure 18. The carrying device 8 can then be moved out of the fuselage 4.

Figures 5A, 5B:
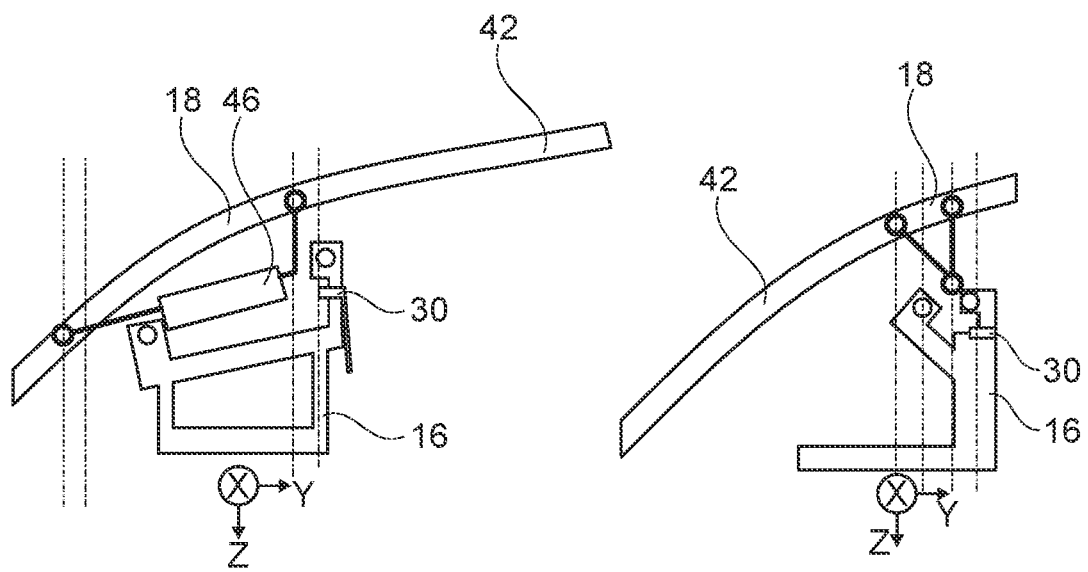
FIGS. 5a-5b show various further variants of truss structures in schematic views.

FIG. 5a shows a truss structure 18 with a PSU element 46 integrated therein. FIG. 5b shows a different form of a truss structure 18. Of course, other truss structures that can be installed in the fuselage 4 with the aid of the installation system 2 are conceivable.

Figure 6A:
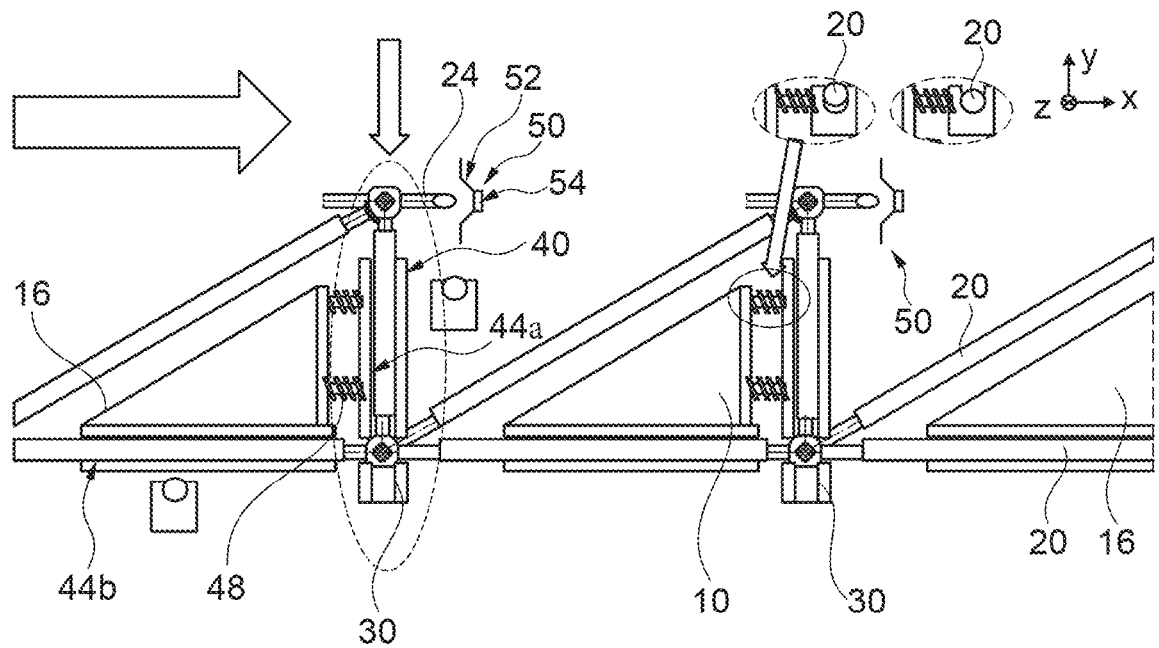
FIG. 6a shows a schematic illustration of the approach of the truss to receptacles in fuselage frames.
Figure 6B:
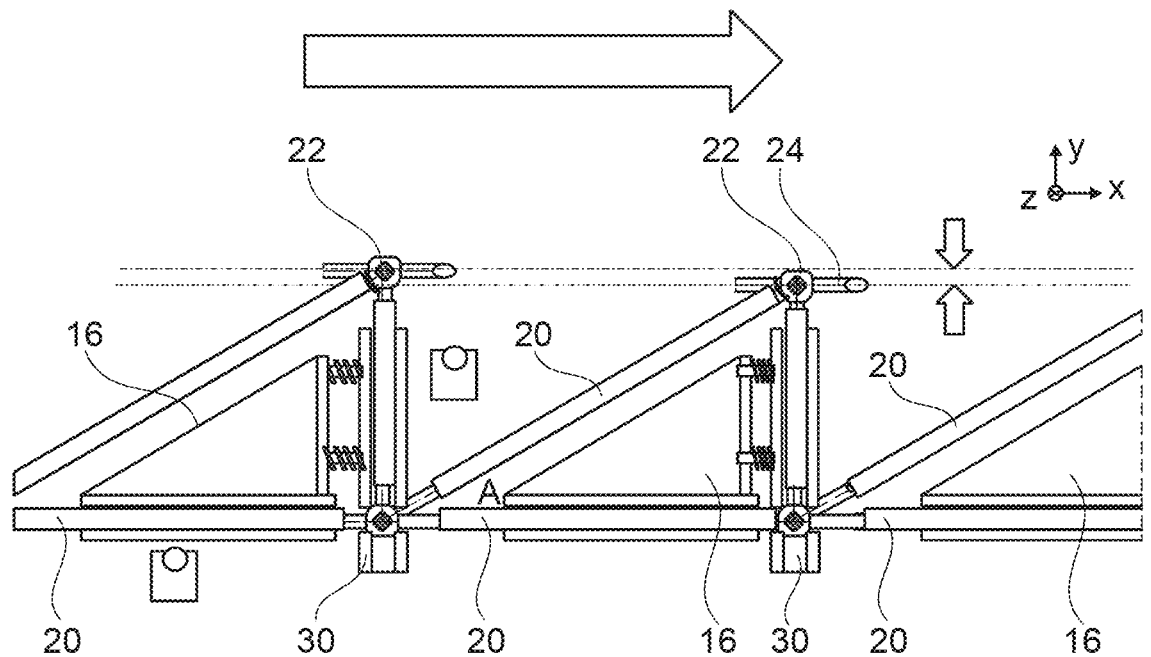
FIG. 6b shows a schematic illustration of the latching of the truss in receptacles in fuselage frames.

FIG. 6a shows the stand 16 in a plan view, wherein the preassembled truss structure 18 lies in the open receptacles 44. It can be seen here that a radially aligned receptacle 44a is resiliently mounted on the stand 16 by means of springs 48. The radial receptacle 44a is preferably guided on the stand 16 in such a way that it always extends perpendicularly to an axial receptacle 44b, and the truss elements 20 arranged in the two receptacles 44a and 44b are always aligned perpendicularly to one another.

The receptacles 44a and 44b furthermore allow tolerance compensation in the vertical direction since the truss elements 20 are mounted in a floating manner therein, as can be seen in the two detail illustrations at the top right in the plane of the drawing. As a result of movement of the stand 16 in a direction along the longitudinal axis, the latching elements 24 arranged on the outer nodes 22 reach corresponding latching receptacles 50, which have a tapering entry region 52, which moves the respective latching element 24 and thus the nodes 22 secured thereon, with the respectively attached truss elements 20, such that the latching elements 24 each latch with a latching opening 54.

FIG. 6b shows the process of latching. Owing to the resilient mounting of the radial receptacles 44a, a tolerance-related dimensional deviation in the direction of the longitudinal axis can be compensated for by the individual springs 48 being compressed to a greater or lesser extent, depending on the resulting position of the radial receptacles 44a, and at the same time exerting a sufficient latching force. FIG. 6b shows, for example, a resulting tolerance compensation in the radial direction (dashed lines) and, by the differently compressed springs 48, in the direction of the longitudinal axis.

Subsequent movement of the stand 16 back in the direction of the longitudinal axis relaxes the springs 48 again, and lowering the stand 16 finally releases the truss structure 18 and enables it to be fitted with appropriate equipment.

Figure 7:
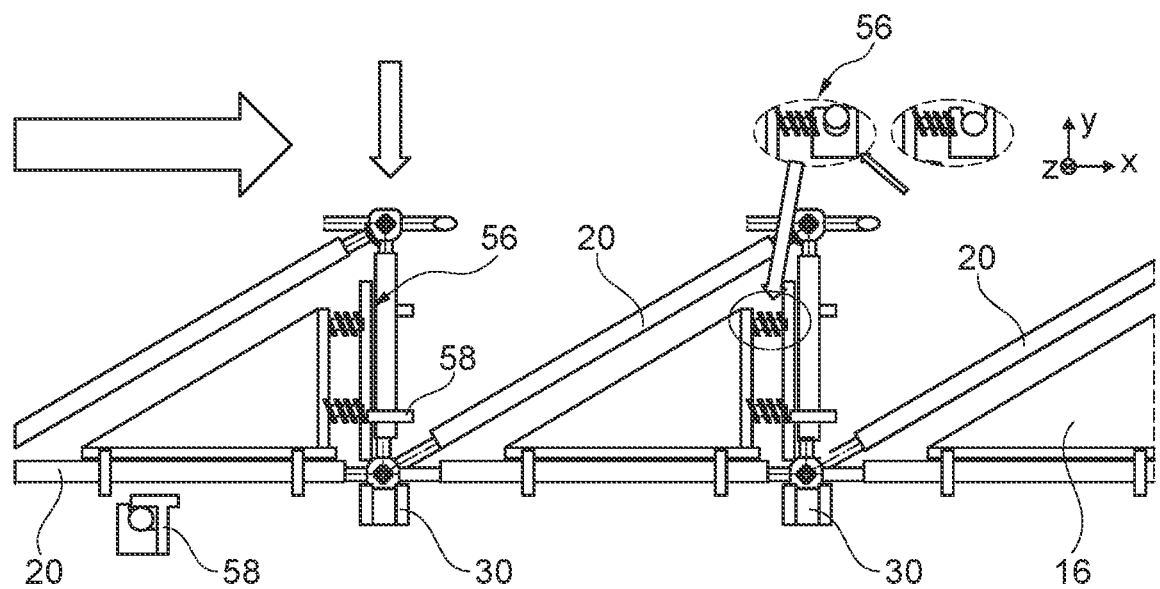
FIG. 7 shows a schematic illustration according to FIG. 6a with modified open receptacles having transport retainers.

FIG. 7 illustrates slightly modified open receptacles 56 that are open not only upward but also in the axial direction toward a side facing away from the springs 48. The truss structure 18 is secured in the receptacles 56 by a plurality of transport retainers 58. These could be removed manually as soon as the truss structure 18 is arranged on the fuselage frames 42. However, the transport retainers 58 could also be released by retracting the stand 16 in order to subsequently be removed manually from the truss structure 18.

Figure 8:
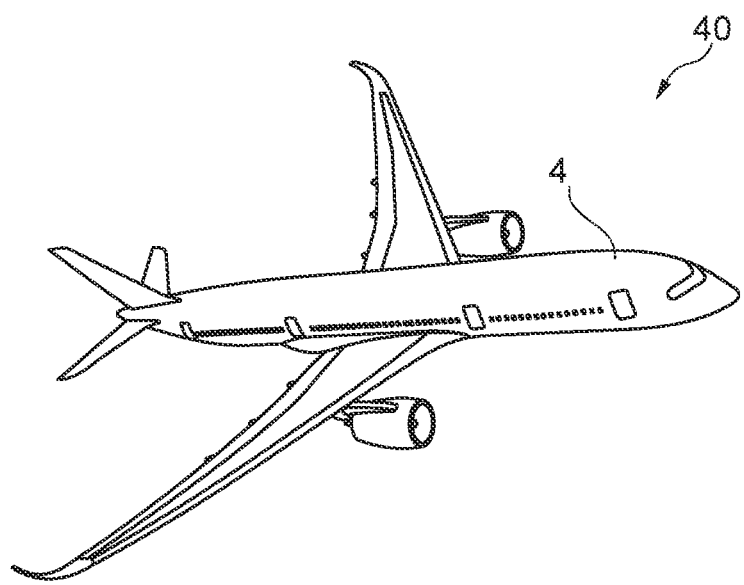
FIG. 8 shows an aircraft.

FIG. 8 shows an aircraft 60 having a fuselage 4, in which a truss 18 is installed by means of an installation system 2.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 2 installation system
4 fuselage
6 floor
8 carrying device
10 wheel
12 upper receptacle
14 movement device
16 stand
18 preassembled truss structure
20 truss rod
22 outer node
24 latching element
26 connecting node
28 node element
30 drive
31 engagement element
32 actuating element
34 first positive engagement means
36 modified first positive engagement means
38 radial projection
40 groove
41 second positive engagement means
42 fuselage frame
44 open receptacle
46 PSU element
48 spring
50 latching receptacle
52 entry region
54 latching opening
56 open receptacle
58 transport retainer
60 aircraft

The invention claimed is:

1. An installation system for installing a self-(Currently Amended) supporting truss structure having a plurality of interconnected truss elements on a fuselage of an aircraft, wherein the self-supporting truss structure has radially outer closed truss nodes and radially inner releasable connecting nodes, the installation system comprising:
a mobile carrying device having an upper receptacle, the mobile carrying device movable on a floor of the fuselage,
a stand for temporarily holding the plurality of interconnected truss elements in predetermined positions relative to one another, and
a movement device arranged on the upper receptacle, the movement device to hold the stand in a position that is set relative to the upper receptacle,
wherein the movement device is configured to hold the stand in a transport position and in any desired installation position, wherein the stand is further away from the upper receptacle in installation positions than in the transport position,
wherein the installation system is configured, when the stand is in the transport position, to move the mobile carrying device on the floor into a predetermined position within the fuselage and to lock the mobile carrying device, to move the stand into a suitable installation position with the movement device, and to lock at least one connecting node with a drive arranged on the stand.

2. The installation system as claimed in claim 1, wherein the at least one connecting node has a plurality of node elements, which are arranged at an angle to one another and are connected to a truss element.

3. The installation system as claimed in claim 1, wherein the at least one connecting node is rigid such that angles of node elements are invariable.

4. The installation system as claimed in claim 2,
wherein the connecting node has first engagement means including a first set of toothed elements for each relevant truss element, the first engagement means configured to compliment second engagement means including a second set of toothed elements on the truss elements, and
wherein the first engagement means is brought with an actuating element provided in the connecting node into a locking position, in which the first engagement means engage in the second engagement means, and into an insertion position, in which the first engagement means moved relative to the second positive engagement means.

5. The installation system as claimed in claim 4, wherein, in the insertion position, the first engagement means is moved relative to the second engagement means, and, in the locking position, is locked in the respective position.

6. The installation system as claimed in claim 4, wherein the actuating element is connected to the drive.

7. The installation system as claimed in claim 1, furthermore comprising a plurality of latching receptacles, which is secured in the fuselage structure and are configured to receive latching elements of radially outer nodes of the self-supporting truss structure, the plurality of latching receptacles to latch with the latching elements with mechanical pressure directed from a relevant node to the respective latching receptacle.

8. The installation system as claimed in claim 1, wherein the stand has a plurality of upwardly open receptacles, into or onto which the truss elements is brought.

9. The installation system as claimed in claim 7, wherein the stand has a plurality of upwardly open receptacles, into or onto which the truss elements is brought,
wherein a subset of the open receptacles is aligned radially, and
wherein the radially aligned open receptacles are resiliently mounted in an axial direction.

10. The installation system as claimed in claim 7, furthermore comprising at least one transport retainer for holding the self-supporting truss structure in the open receptacles.

11. An aircraft having the fuselage and the self-supporting truss structure arranged within the fuselage, comprising the installation system as claimed in claim 1.

12. The aircraft as claimed in claim 11, wherein the self-supporting truss structure is arranged on radially outer regions of a passenger cabin in order to hold overhead stowage compartments.

13. A method for installing a self-supporting truss structure comprising a plurality of interconnected truss elements on a fuselage of an aircraft, wherein the self-supporting truss structure has radially outer closed truss nodes and radially inner releasable connecting nodes, the method comprising the following steps:
providing a preassembled truss structure in the fuselage on a stand which is held by a carrying device in such a way that the carrying device is moved by with a movement device,
moving the carrying device to a predetermined position within the fuselage,
locking the carrying device,
raising the stand and moving the stand in a radial direction to align the stand on a fuselage structure, latching the outer truss nodes to corresponding latching receptacles on the fuselage structure by urging the self-supporting truss structure in an axial direction into the latching receptacles, wherein a predetermined alignment of the plurality of interconnected truss elements relative to one another is maintained, locking the radially inner connecting nodes, and removing the stand.

14. The method as claimed in claim 13, wherein the removal of the stand comprises lowering the stand, moving the stand in a direction away from the fuselage, and moving the stand out of the fuselage.

* * * * *